HIGH SPEED DATA DISPLAY AND RECORDING APPARATUS

Original Filed Dec. 19, 1960 5 Sheets-Sheet 1

INVENTORS:
Louis M. Moyroud
René A. Higonnet

HIGH SPEED DATA DISPLAY AND RECORDING APPARATUS

Original Filed Dec. 19, 1960

5 Sheets-Sheet 2

INVENTORS:
Louis M. Moyroud
René A. Higonnet

HIGH SPEED DATA DISPLAY AND RECORDING APPARATUS

Original Filed Dec. 19, 1960

INVENTORS:
Louis M. Moyroud
René A. Higonnet

HIGH SPEED DATA DISPLAY AND RECORDING APPARATUS
Original Filed Dec. 19, 1960 5 Sheets-Sheet 4
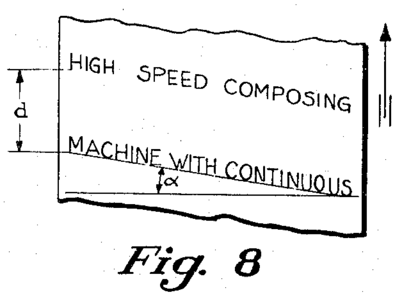
Fig. 8
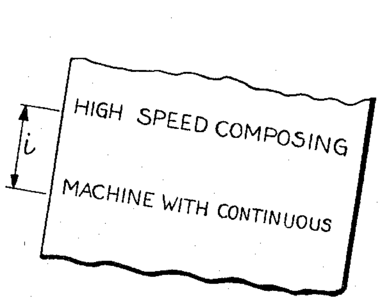
Fig. 9
Fig. 10
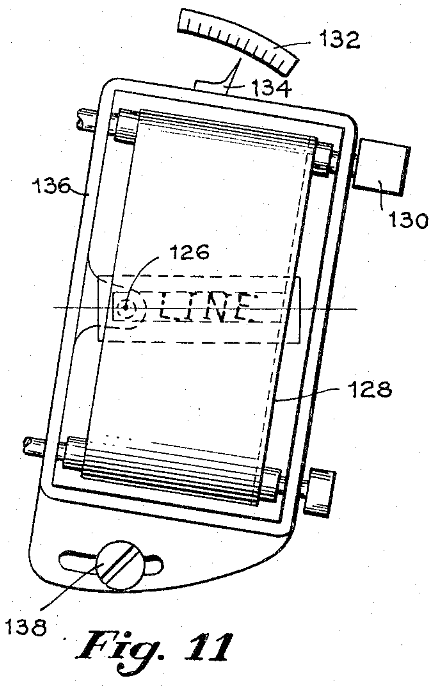
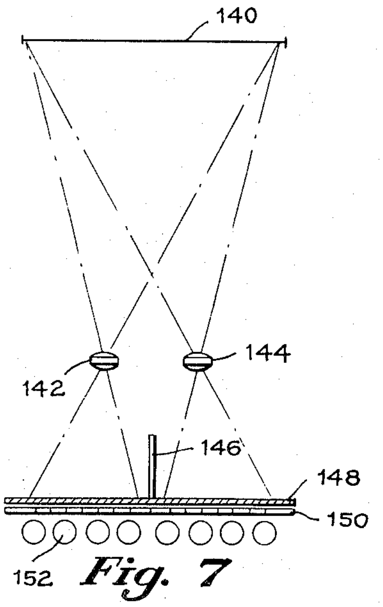
Fig. 11 Fig. 7
INVENTORS:
Louis M. Moyroud
René A. Higonnet

HIGH SPEED DATA DISPLAY AND RECORDING APPARATUS

Original Filed Dec. 19, 1960 5 Sheets-Sheet 5

INVENTORS:
Louis M. Moyroud
René A. Higonnet

United States Patent Office 3,254,579

Patented June 7, 1966

3,254,579

HIGH SPEED DATA DISPLAY AND RECORDING APPARATUS

René A. Higonnet, Cambridge, and Louis M. Moyroud, West Medford, Mass. (both % Photon, Inc., 355 Middlesex Ave., Wilmington, Mass.)

Continuation of application Ser. No. 76,934, Dec. 19, 1960. This application Sept. 26, 1963, Ser. No. 313,409
3 Claims. (Cl. 95—4.5)

This application is a continuation of our copending application Serial No. 76,934, filed Dec. 19, 1960, now abandoned.

This invention relates to a high speed luminous recorder controllable, in particular, by data processing machines and information transmission and transcription systems.

The prior art of high speed recorders requires storage for at least one line of characters. This involves a large amount of equipment the cost of which is usually very large. According to a feature of the present invention it is possible to accept a line of characters from a computer or from a magnetic tape without the use of storage. According to the present invention a serially presented intelligence information can be produced in visual form on a screen or printed on a light sensitive medium at an extremely high speed to follow computer outputs, the limit being the simultaneous projections of all the elements of entire lines.

An object of this invention is to provide a high speed line recorder capable to record all the characters of a line either one at a time as the information is received by said recorder or simultaneously if the information of entire lines is stored in advance of the recording operation.

Another object of this invention is to provide a novel high speed projection system to produce and record entire lines of information at a high speed of several hundred lines per second.

It is another object of this invention to provide a high speed indicator for visual observation of data.

It is another object of this invention to provide a static high speed line printer which is capable of printing on a light sensitive medium all the characters of a line simultaneously.

It is still another object of this invention to provide a novel high speed photographic printer wherein the image receiving medium is continuously moving in one direction at a uniform speed.

Other objects and features of the present invention will become apparent from the following description taken together with the accompanying drawings in which:

FIGURE 7 represents schematically the optical arrangement of a recorder according to the present invention embodying mechanical shutters for the selection of characters.

FIGURE 8 represents the appearance of text matter on a continuously moving film with no compensation for continuous motion of said film.

FIGURE 9 shows the appearance of lines on a continuously moving film with compensating means as per a feature of this invention.

FIGURE 10 shows the appearance of characters produced at the output of the optical system of the high speed recorder when a continuously moving recording medium is used.

FIGURE 11 represents schematically the recording medium holder of the embodiment of the present invention with a continuously moving recording medium.

Figures 1, 2:
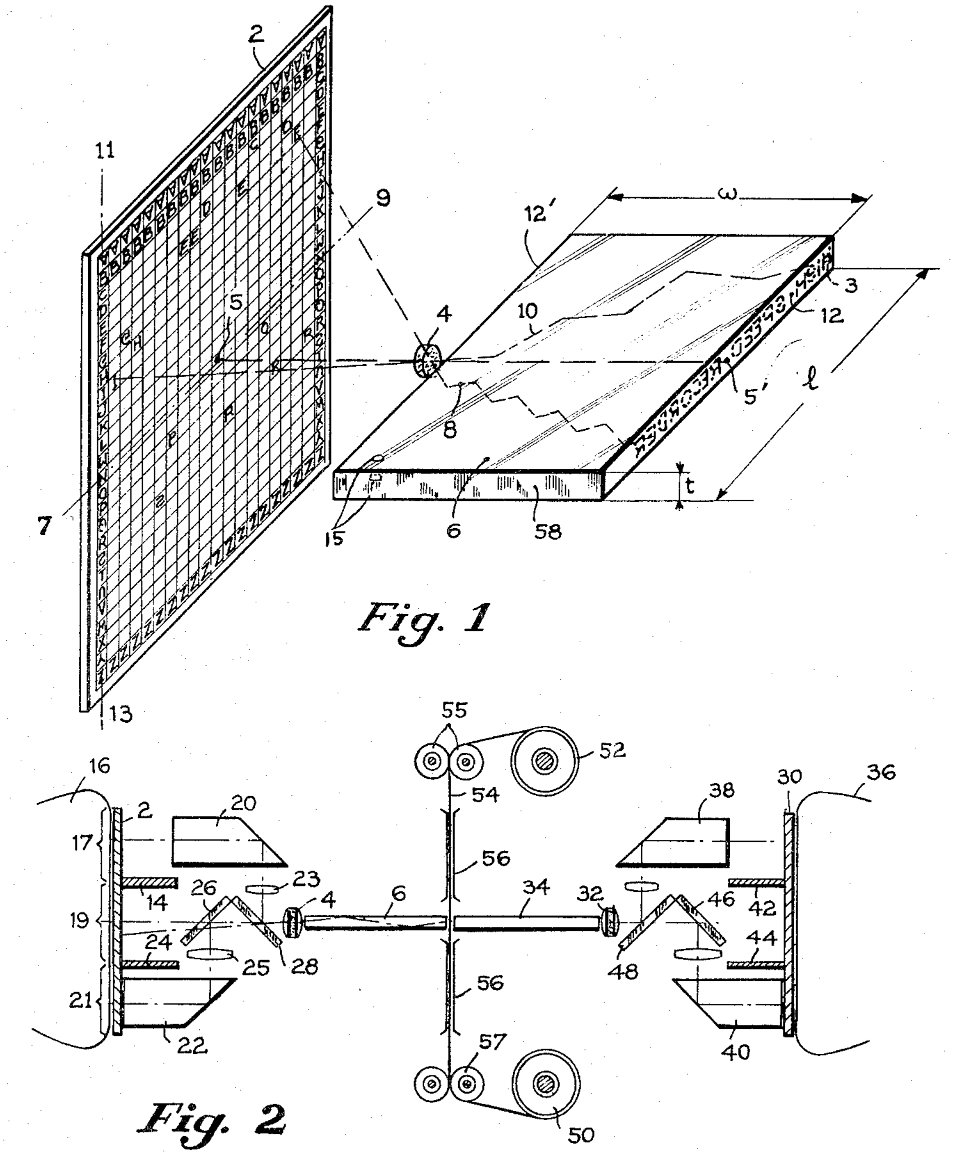
FIGURE 1 is a diagrammatic representation of the optical system of the high speed recorder.
FIGURE 2 represents schematically a high speed recorder of larger capacity.

The main components of the novel high speed recorder are shown in FIGURE 1. A matrix plate 2 which can be a photographic glass plate, is provided with characters or symbols transparent on opaque background. In the example shown there are as many horizontal rows of equally spaced characters as there are different characters in the alphabet. Each horizontal row consists of the same character and the spacing of the characters in a horizontal row determines the spacing of the characters in the lines appearing at the output of the recorder. Characters at the same location in the horizontal rows determine columns containing all the different characters available in said location in the different lines produced by the recorder.

There are, consequently, on the matrix, as many vertical columns of a given alphabet as there may be characters in the lines to produce composed of any of the characters of the alphabet. Selective illumination means are located at the rear of the matrix plate to project images of characters as will be explained later.

A projection lens 4 is positioned at approximately the center of the matrix plate 2 with its optical axis passing through the center of a character and through the center of a flat block of glass 6.

Projection lens 4 is positioned in relation with the matrix 2 and the rear face 12 of the glass block so that a sharp image of an object point 5 is made at 5′ on face 12 of the glass block.

The width "*w*" of the glass block depends on the focal length of lens 4 and on the matrix size. The length "l" of the glass block determines the maximum length of line which can be recorded and the thickness "*t*" of the block is proportional to the distance between consecutive horizontal rows of the master characters of plate 2.

The projection lens 4 is designed to take into account the presence of the glass block in the path of light emerging from said lens and its aperture is determined by the thickness of said block.

The two edges 12 and 12′ of the block of glass parallel with the matrix plate are ground flat and polished. The end edges such as 58 playing no part in the invention, do not have to be polished. The two large faces of the block should be polished flat and parallel.

As seen in the figure, square or rectangular elemental areas are affected to each character. The central elemental area is intersected by the optical axis of lens 4 at a point 5 which is approximately located at the center of a character. In the case of the figure, the character intersected by said optical axis is "N." As seen in said FIGURE 1, the horizontal plane defined by the optical axis 5–5′ of lens 4 and line 7–9 passing through point 5 and parallel with the large faces of block 6 intersects the matrix plate 2 through the center of the horizontal row of letters "N." By illuminating, from the back of matrix plate 2, this horizontal row of characters, an inverted line of N's made to appear on the face 12 of block 6. The center character is projected at 5′, the character to the right of the center character of matrix 2 (as seen in the figure) is projected to the left of 5′ etc., each letter N on face 12 being spaced in proportion to the spacing of the master N's on line 7–9. For the projection of the line of characters, the presence of the glass block 6 has no other effect but to lengthen the lens-image distance as compared to what it would be if no glass were used. For the projection of any other character of the matrix, the large faces of the glass block behave like reflecting surfaces, and by properly spacing the horizontal rows on matrix 2, it is possible to project on a common base line of face 12 any of the characters of the matrix. In one embodiment of the invention, the size of the master characters is the same as the size of the images produced, and the spacing of the horizontal rows of the matrix is equal to the thickness "*t*" of the glass block. By shifting the illumination from the back of the row of characters on line 7–9 one step down so that a line of "0's" is illuminated, the image of said line appears at the back face 12 of glass block 6 on the same base line as the line of "N's" as the bundle of rays defining said image are reflected once by the upper large face of the glass block. By moving the illumination another step down, behind the row of "P's," an image line of these characters will also appear on the same base line, the rays defining said image having undergone two successive reflections, one by the upper face of the glass block and another by its lower face. A third row of characters counting from line 7–9 will be projected after 3 reflections and so on. As shown in FIGURE 1, the master characters of successive horizontal rows are alternately erect and reversed to compensate for the reversing of images produced by the reflections inside the glass block. Thus, any selectively illuminated character of matrix 2 is projected on the same common base line on face 12. The location of any projected character in the line produced by the system is determined by its distance from the vertical column of the matrix from which the first character of said line is projected. In the example shown, this first vertical column is at 11–13 and as there are 20 vertical columns in the matrix, the total capacity of the system is 20 characters per line.

In the example shown in FIGURE 1 it has been assumed that each master character can be selectively illuminated by an individual light source. The characters shown separately in the matrix are those which are illuminated in order to project on face 12 of the glass block the line "HIGH SPEED RECORDER." Letter "H" is illuminated in the first column 11–13 and its image is produced at 3 on face 12 of the glass block after 6 reflections and an angular travel which brings it to the opposite side of optical axis 5–5′. In the second column, letter "I" is illuminated and its image reaches a location on face 12 next to the image of "H" after 5 successive reflections as shown by line 10. In the third column, letter "G" is illuminated and, after 7 reflections, its image appears next to the image of "I" and so on. Finally, the letter before last "E" is projected after 9 reflections as shown by line 8 and the last letter "R" of the line is projected after 4 reflections. Black spaces between words are of course obtained by not illuminating letters of the columns corresponding to their locations. It is clear that all the characters used in a line can be projected either simultaneously or successively.

The images appearing on back face 12 can be of very high optical quality when a properly designed lens is used. It can be pointed out that the successive reflections inside the glass do not increase the length of the individual light paths over what these lengths would be if a block of glass of a cross section equal to the size of the matrix were used. In this case, the lens 4 would make an image of the matrix 2 and the luminous path of the rays forming each character would be of the same length as it is in the present embodiment of the invention after incurring a number of reflections. It can also be pointed out that substantially no loss of light is incurred through the successive reflections inside the glass as the rays forming each image make, with the two large faces of the glass block, an angle which is smaller than the critical total reflection angle. Thus, each character is projected to the rear face of the glass block as a sharp image with no loss of luminosity.

The system represented on FIGURE 1 can be used as a viewer for example for computer outputs in which case the rear face 12 of the block is coated with a diffusing substance or covered with a diffusing material. This system is particularly adaptable to the presentation of numbers in a computing machine and can replace more expensive and bulky equipment. The most evident application of the invention, however, is for the permanent recording of lines of characters and in this case, a light sensitive medium is positioned adjacent to the rear face 12 of the block. The light sensitive medium can be either a photographic film or paper or electrostatically charged paper as is well known to the man of the art.

The total number of characters which can be projected by the system depends on the useful angle of the lens, the size of the master characters, and the focal length of the lens. In practice, it has been found desirable to increase the total capacity of the high speed recorder by other means than an increase of the number of characters included in the angular coverage of the lens.

Figure 3:
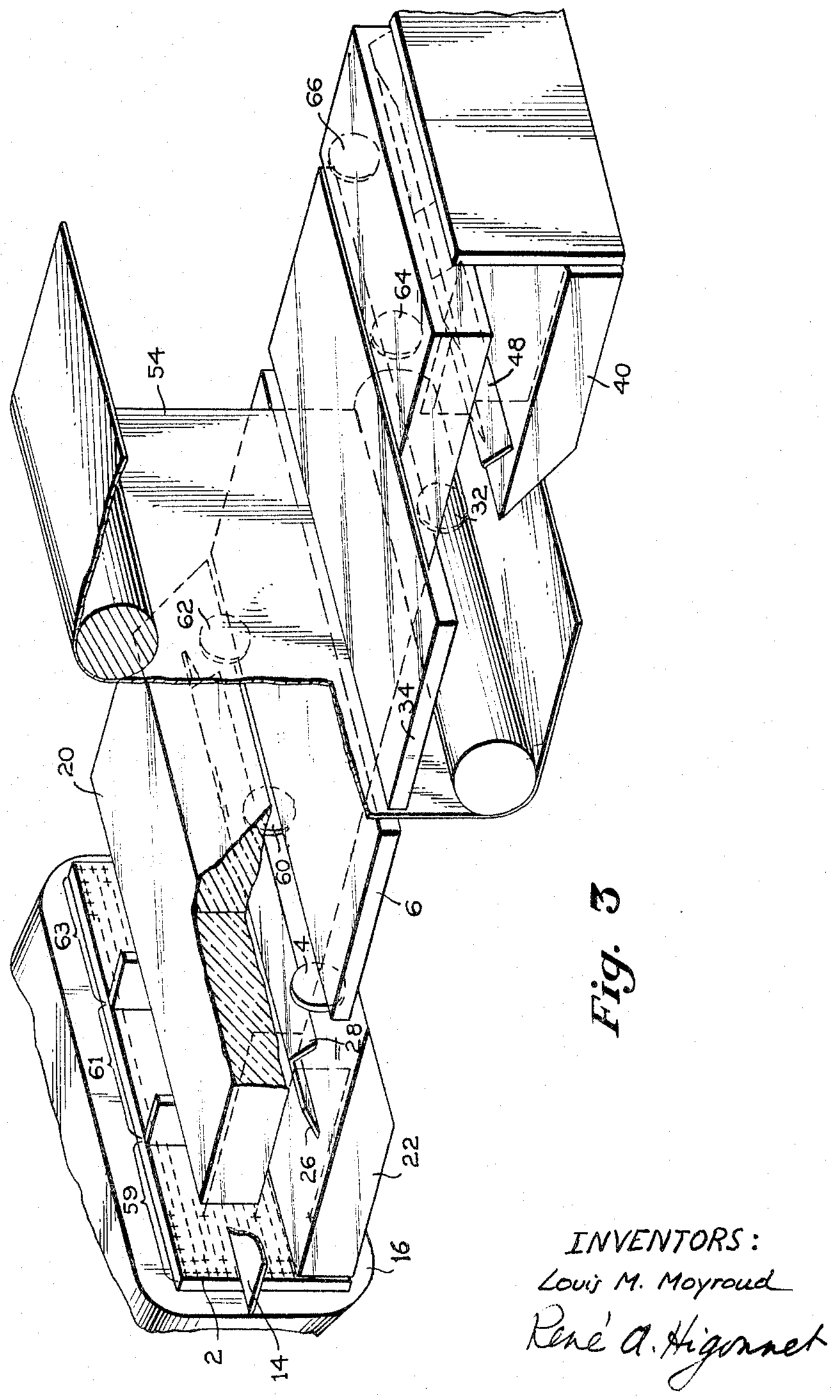
FIGURE 3 represents in perspective the same arrangement as shown in FIGURE 2.

A preferred embodiment is shown in FIGURES 2 and 3. In this embodiment two matrix plates 2 and 30 are simultaneously used, containing each two sets of 60 different characters which gives to the machine a total capacity of 120 different characters per alphabet. The illumination of selected characters is obtained by the use of cathode ray tubes 16 and 36, the purpose of which is to project a luminous spot of substantially the same size as a master character at the rear of the matrix and opposite the characters to be projected. The advantages of the use of cathode ray tube for this purpose are evident as they enable the rapid selection of points to illuminate and permit the rapid projection of lines one character at a time. If necessary, more than one cathode ray tube can be used for each matrix plate. The cathode ray tube screen should be of the appropriate material and be as close as practically possible to the matrix. As shown in FIGURE 2 each matrix is divided in three sections 17, 19, and 21 containing each 20 horizontal rows of characters. These three sections are all projected to the same line through lens 4 and glass block 6. The characters of sections 17 and 21 are merged with characters from section 19 through an optical merging device comprising prisms 20 and 22, correction lenses 23 and 25 and semi-reflecting mirrors 26 and 28. Screens 14 and 24 are provided to prevent any light from one section to reach the other section. The dimensions of glass blocks or prisms 20–22 are determined to compensate for the difference of the geometrical length of the light rays coming from sections 17 or 21 as compared to the central section 19. As is well known to the man of the art, the introduction of a block of glass with parallel polished faces in an optical system has the effect of moving the image further away from the lens. It is thus possible to compensate for the extra distance the character images from group 17 and 21 have to travel by the introduction of the proper amount of glass in their path. As the introduction of parallel blocks of glass in an optical system, on the other hand, introduces aberrations or distortions, correcting lenses 23 and 24 are preferably added as shown in the drawing.

In the example shown, on FIGURES 2 and 3, it is assumed that the recorder is used for permanent recording on a piece of light sensitive film or paper. Photographic film or paper or a light sensitive statically charged paper can be used in the present recorder. The paper 54 is preferably continuously fed from a feed spool 52 around rollers 55, between presser plates 56, between another pair of rollers 57 to the receiving spool 50. Rollers 55 act as brakes and rollers 57 are the driving rollers and are connected to a continuously rotating mechanism through a clutch. It may be desirable in certain cases to drive the light sensitive medium intermittently after each line in which case rollers 57 would be connected to any appropriate intermittent paper feed. In order to double the number of different characters which can be projected, it is contemplated, as shown in FIGURE 2, to use a second optical system similar to the one just described on the other side of film or paper 54. This system is more particularly applicable in the case where any transparent light sensitive material is used. A second lens 32 associated with glass block 34 and merging system 38, 40, 48 and 46 project the characters produced from matrix 30 on the same line as those produced by matrix 2.

In order to increase the length of line determined by the total number of characters which it can comprise, several lenses can be associated with the same block of glass as shown in FIGURE 3. In this figure, the same components as those shown in FIGURE 2 are represented with the same reference numbers. In addition, FIGURE 3 represents six lenses, three on each side of the film, shown at 4, 60, 62, 32, 64 and 66. In this particular case, each lens is affected to one third of the matrix area, said matrix being thus further divided in three sections 59, 61 and 63 as shown. Each section can contain, for example, 25 vertical columns of characters giving a total line capacity of 75 characters. There is, of course, no limitation, in the number of lenses which can be used in order to increase the number of characters which can be simultaneously projected to the viewing screen or sensitized material.

Figure 4:
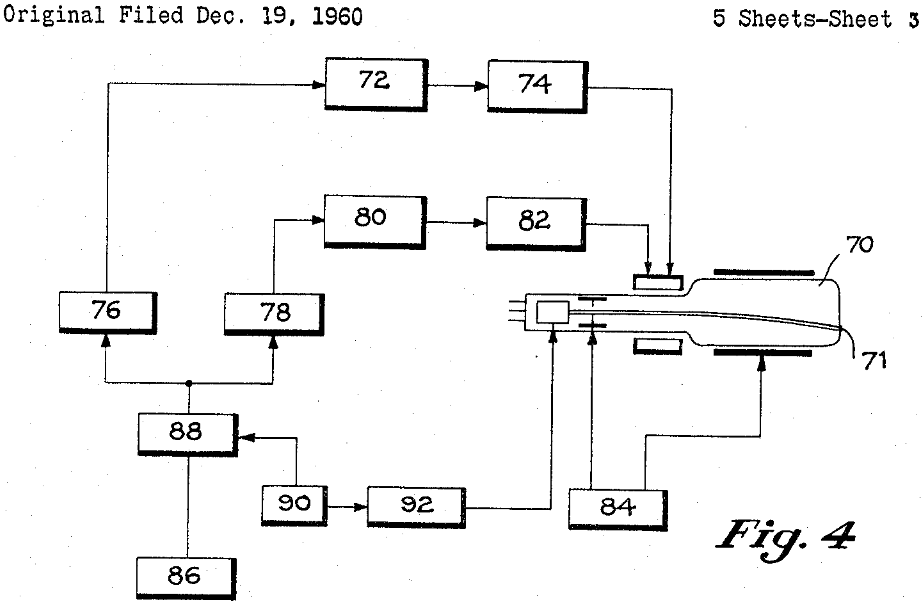
FIGURE 4 is a simplified block diagram showing the arrangements of the main components of a high speed recorder.

FIGURE 4 is a block diagram of the circuit components used to control the illuminating means of the high speed recorder shown on FIGURES 2 and 3. Block 86 represents the computer output or magnetic tape or other storage which contains, generally in coded form, all the information required to transcribe lines of numerals or letters onto a recording medium. This information is sent to a buffer unit 88 and from this unit reaches selecting circuits 76 and 78. Circuit 76 comprises a decoder which detects the alphabetical identity of the character to be projected according to the information obtained from the computer. The character identity in coded form is sent to a converter 72 and the vertical deflection circuit 74 of the cathode ray tube 70. Thus, depending on the identity of the character to be projected, the luminous spot 71 of the cathode ray tube moves in the direction perpendicular to line 7–9 (FIGURE 1) to stop opposite the horizontal row of the character to be projected.

The displacement of the luminous spot along a direction parallel to line 7–9 of FIGURE 1 is obtained by the column selection circuit 78, the converter 80, and the horizontal deflection circuit 82. The circuit 78 comprises a counter which continuously deflects the spot along the column selection direction, one step for each character received from the computer. In this way it is not necessary to store a whole line of characters before projection although this may be accomplished if so desired. Block 84 is the high voltage supply source, 90 represents the timing circuit which controls the unblanking circuit 92 so that a luminous spot is made to appear at the face of the cathode ray tube for a certain duration for example, 100 microseconds after it has reached the proper character as determined by circuit 76, in the proper column as determined by circuit 78.

Figures 5, 6:
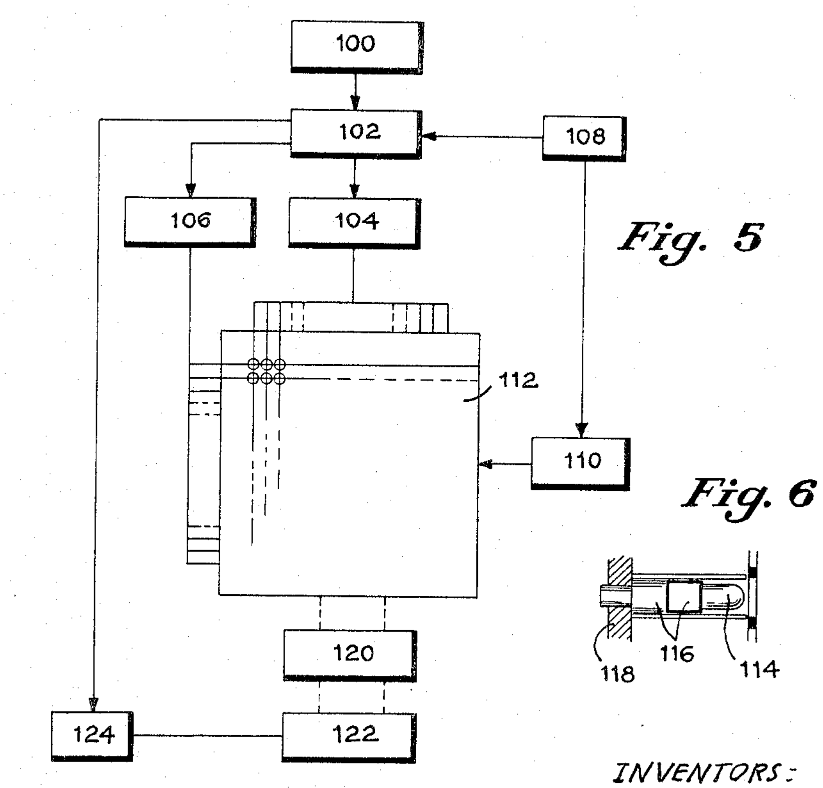
FIGURE 5 represents schematically a block diagram of another embodiment of the high speed recorder.
FIGURE 6 represents one of the flash units used in the embodiment shown on FIGURE 5.

FIGURE 5 shows an alternative where flash lamps are used rather than a cathode ray tube. Each flash lamp 114 is associated with its trigger and discharge circuits 116 and is shown in FIGURE 6, in a common tube. There is one flash lamp for each character of the matrix and all these lamps are mounted in a common plate 118. It is evident that a large number of lamps are necessary when many different characters are to be projected and long lines are desired. But these flash lamps are not subjected to considerable use as, in the average, each lamp is not flashed more than once for a number of lines equal to the number of characters contained in the alphabet. The system shown in FIGURE 5, using flash lamps, is considerably faster than any known system as it may produce lines at the rate of 500 lines per second. The input of the system can be a magnetic tape or computer shown at 100, giving in coded form the necessary information to the high speed recorder. This information reaches a buffer 102 which can comprise a decoder in order to separate the column identity sent to the column decoder 106 from the alphabetical identity sent to the alphabetical decoder 104. If desired, the buffer 102, can be replaced by a storage where a full line can be stored in advance of the recording. The flash lamps such as 114 are arranged in columns and row formation in a matrix 112. A timer 108 controls the succession of operations by stepping the buffer one step each time a flash has occurred and triggering the flash circuit 110 as soon as the buffer has moved to the next character of the line to record. The optical unit is schematically shown at 120 and the light sensitive material at 122. This light sensitive material is driven by a mechanism shown at 124 preferably continuously moving the image receiving material during the recording of lines but arranged to stop and start under the control of buffer 102 as shown.

As a flash light of a few microseconds is sufficient to produce an image on the light sensitive material and as all the characters of a line can be simultaneously projected, it is clear that there is practically no speed limitation in this system except the limitation introduced by the light sensitive material displacement mechanism.

In the embodiment of the invention where the light sensitive material is continuously fed during the projection of a line one character at a time, the characters of the matrix plate instead of being aligned on the same base line, are preferably positioned as shown in FIGURE 10. As shown in this figure, the characters are individually tilted by a certain angle and this angle is determined by the speed of the continuously moving image receiving medium and the speed at which individual characters are projected onto said medium. The tilt is of course zero when all the characters of a line are simultaneously projected. If the characters were positioned as shown on matrix 2 of FIGURE 1 and the recording medium were continuously moved, for example, in the direction of the arrow of FIGURE 8, the lines would have the appearance shown in this figure. This is, of course, evident if it is considered that, after the first character of a line, "H" for example, each has been projected, the sensitive material moves a certain distance so that the next character "I" is displaced in the direction of the motion of the light sensitive material relatively to the first character "H" and in the same manner the next character "G" will be displaced in relation to "I" and so on.

In FIG. 8 the distance between the base line of the first character of the line and the last character of the same line represents the total displacement of the recording material during the time elapsed between the projection of the first and the last character. The base of the characters of a given line makes thus an angle $\alpha$ with a line perpendicular to the edges of the image receiving material or film. In order to align the characters on a common base line and obtain the result shown in FIGURE 9, the film, as shown at 128 in FIGURE 11, is mounted on a tilting frame 136. This frame can rock around a pivot 126 located, for example, at the center of the first character of any line. The angle given to frame 136 can be adjusted and this frame can be locked in position after adjustment by a screw 138. The angle of tilt can be read on a scale 132 cooperating with an index 134. This angle is adjusted for each recording material speed as stated above and is equal to the angle by which the characters are tilted in relation to the face of the glass block as shown in FIGURE 10. In these conditions, the base line of each character projected to the rear face of the glass block 6 of FIGURE 1 is perpendicular to the recording medium.

As shown in FIGURE 8, when the first letter of the first line "H" is projected it appears as shown with the vertical strokes of the letter parallel with the edges of the film. During the time which elapses between the projection of the first character and the next one which is "I" (as in the previous example) the film moves a certain distance so that the next character "I" is aligned on the same base line as "H." Although characters of variable widths can be used in this system, it is preferred to use characters of the same individual set widths as in existing typewriters and high speed printers so that the projection of individual characters can take place at a uniform rate, the film moving by the same distance between the projection of each individual character of the line.

As alternate illumination means, mechanical binary shutters of the kind described in our British Patent No. 733,789 can be used in order to illuminate no more than one character in each vertical column of the matrix.

This arrangement is of particular interest where lower speeds of the recorder are acceptable with a higher light output to print lines on statically charged paper according to known processes.

Figures 12, 13, 14:
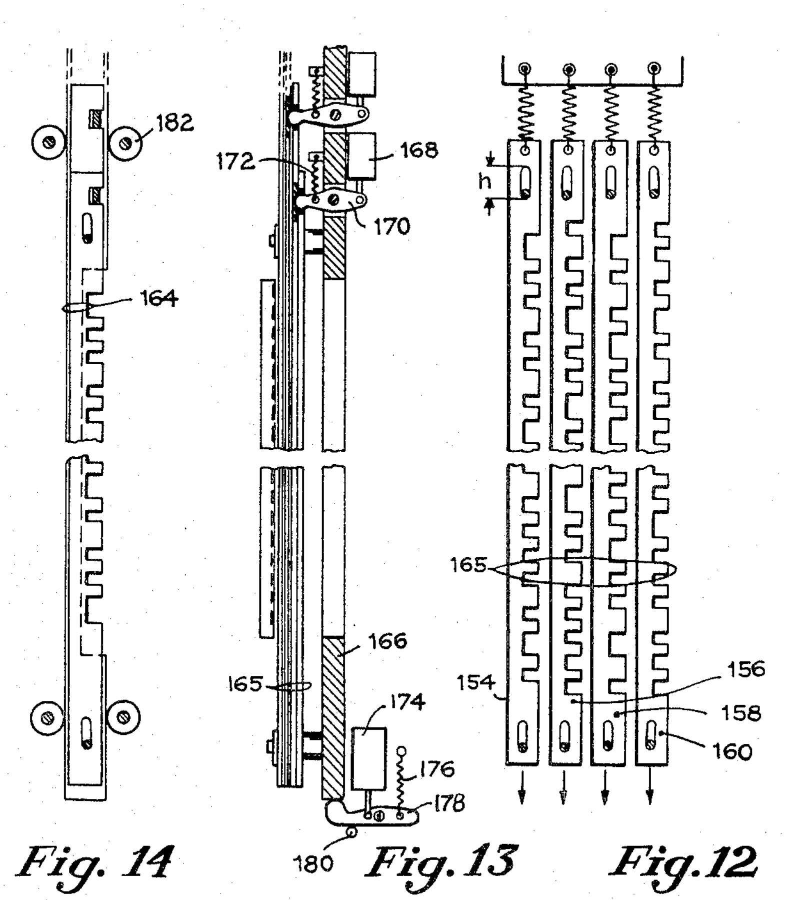
FIGURES 12, 13 and 14 show an arrangement of binary shutters.

In the embodiment shown in FIGURES 12, 13 and 14 it has been assumed that there are no more than 31 characters in a vertical row. A stack of four "binary" shutter plates is positioned opposite each vertical row of the matrix and these shutter plates are notched as shown in FIGURE 12 and explained in the above mentioned patent. Each plate can slide a distance "*h*" upon energization of solenoids 168. Each plate is returned to rest position by springs 172 and levers 170 as shown in FIGURE 13. Each group of four decoding blades is assembled on a common frame 166 which can slide up and down along rollers 182 under the control of a solenoid 174 through lever 178, against spring 176. By proper energization of individual blade solenoids such as 168 a "hole" of the size of a character can be opened along a vertical column of characters to select one character of the group and this hole can further be moved up one step by the energization of solenoid 174 so that with four blades it is possible to selectively illuminate as many as 31 characters. This system enables the use of matrix plates with adjacent characters so that there is no loss of space. As, however, the characters normally positioned opposite the solid section 164 of shutter blades assembly 165 would be continuously masked by said shutters, the system shown in FIGURE 7 can be used in which two lenses, 142 and 144, are located in the optical system in such a way that both lenses project two groups of vertical columns of characters on the same common line 140. In this case, the matrix shown at 148 is divided in two halves by a screen 146. One vertical column out of two in each half is used, the other column devoid of characters is opposite the solid part 164 of the shutters. The shutter mechanism is schematically shown at 150 in FIGURE 7, and the illuminating means in the form of lamps at 152. Although this arrangement requires a larger number of lenses it makes it possible to use mechanical shutters without having to leave blank spaces on the matrix to accommodate said shutters.

Figure 15:
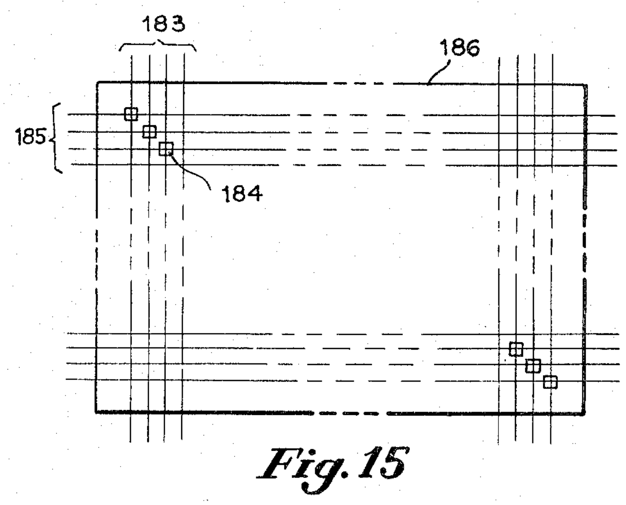
FIGURE 15 represents a shutter card for the simultaneous production of entire lines of characters.

Another form of mechanical shutter is shown in FIGURE 15. This figure represents a punched card 186 of opaque material placed adjacent to the matrix and preferably between said matrix and the projection lens. The whole area of the matrix is illuminated in its entirety and the selection of the characters to be projected to form a line is made by selectively punching holes 184 in the card. Each line to be projected corresponds to one card of substantially the size of the matrix. The holes through which characters are projected are substantially of the same size as each elemental area containing a character and are located along coordinates 183 and 185. The spacing of lines 185 is equal to the spacing of the master characters in a vertical column of the matrix and the spacing of lines 183 is equal to the spacing of the identical characters in a horizontal row. In the example shown, card 186, when used as a mask against the illuminated matrix plate 2 of FIGURE 1 will produce the entire alphabet on the face 12 of glass block 6. Means are presently available to move cards past the matrix plate at sufficient speed to produce several lines per second. In an embodiment of the invention, the cards are continuously moved past the matrix and adjacent to it and the leading edge of each card triggers a flash circuit at the instant the card is exactly aligned in the system. The flash illuminates the whole matrix but the only characters projected are those facing holes of the card at the time the flash occurs.

Although the embodiment of the invention described includes a flat block of glass as reflecting means, it is clear that it can be replaced by any other equivalent arrangement, particularly by two parallel front surface mirrors.

One advantage of the invention is the possibility of storing the signals making up a line in a memory as they arrive and, when a whole line thus has been stored, to trigger simultaneously all the illuminating means associated with each column in order to project said line in one operation. It follows that the permissible exposure is equal to the time it takes for a complete line to be stored in the said mmeory. In the case of high speed telegraph circuit transmitting characters at the speed of 100 characters as second, and a line comprising 25 characters, the permissible exposure time is 250 milliseconds. This is a long enough exposure to make it possible to use receiving surfaces of low sensitivity associated with such processes as xerography, and films devolped by heat.

The memory may comprise any possible elements which have two stable positions such as electromagnetic devices, magnetic cores, etc., according to the desired speed.

In one embodiment the memory may have the same matrix arrangement as the character matrix itself. Such matrices using for instance bi-stable magnetic cores are well known in the art and the arrangement will not be described in detail. One particular core is allocated to one particular character of the matrix and when a signal arrives it magnetizes the core corresponding to the character it represents. When one core has thus been magnetized per column, a single reading wire passing through the center of all the cores is energized and produces a signal in the output leads of each of the cores which have been magnetized in the recording operation. Each of these reading out wires is connected to one particular illuminating means associated with the corresponding character matrix and causes it to be illuminated. The memory is thus read in a single operation and made free to receive another line. The exposure may, of course, last until another complete line has been stored. This straightforward arrangement has, however, the drawback of necessitating one core per character matrix. It may be simplified, especially when the signals coming in are in the form of coded signals, if the characters are stored in their coded form. In this case, for instance for telegraphic purposes a 5-element binary code is sufficient for the alphabet and no more than 5 magnetic memory elements per column are used. As the transmission progresses the signals are applied in succession to one such group of memory elements five per character. When a complete line has been stored, the memory elements are all read at the same time, for instance by an appropriate timing pulse. The ouput signals obtained by each of these groups of 5 memory elements then control the illumination means associated with the character they represent. This operation, or decoding, may be effected by a number of various means which will not be described here, since they are will known in the art. In the case where mechanical or other binary shutters are used, each core may be associated with each shutter blade so that no code translation is necessary.

While preferred embodiments of the invention have been described, they may be modified in conformity with the present or future knowledge in the art to suit particular applications, as will be readily appreciated.

What is claimed is:

1. In a high speed recorder for presenting characters in line formation on an image receiving medium, the combination of a matrix plate with light transmitting characters or signs arranged in row and column formation, each row containing the same character regularly spaced and repeated as many times as there may be characters in the line and each column containing different characters, a lens positioned to make an image of said plate on the image receiving medium, a pair of parallel reflecting surfaces between said lens and said image receiving medium positioned so that the optical axis of the lens is substantially at equal distances from said reflecting surfaces, said reflecting surfaces being substantially perpendicular to the columns of the said matrix and spaced in relation to the distance between consecutive characters in each column, a single source of light comprised of a cathode ray oscilloscope with a control circuit producing a light spot of appropriate dimension to illuminate a selected light transmitting character in each of the various columns in succession, whereby through the action of the lens and of multiple reflections between the reflecting surfaces, the illuminated characters are projected on the image receiving medium on a fixed line at positions determined by the columns containing the selected light transmitting characters, and means to move the image receiving medium continuously in a direction transverse to said line.

2. The combination according to claim 1, wherein the selected characters in adjacent columns are successively projected and the image receiving medium is skewed so that all of the character images in a line are arranged transversely to the margin thereof.

3. The combination according to claim 1, wherein the image receiving medium is slanted with respect to the reflecting surfaces and moves at a continuous uniform speed such that the differences in time between two consecutive projections of character images is equal to the time taken by the sensitive surface to move a distance sufficient to align said consecutive character images, the characters in the matrix plate being also slanted in order to produce lines perpendicular to the edges of the image receiving medium.

References Cited by the Examiner

UNITED STATES PATENTS

| | | | |
|---|---|---|---|
| 2,379,880 | 7/1945 | Burgess | 178—15 |
| 2,392,224 | 1/1946 | Bryce | 95—4.5 X |
| 2,553,285 | 5/1951 | Thomas | 88—24 |
| 2,596,741 | 5/1952 | Tyler | 346—33 |
| 2,725,786 | 12/1955 | McCarthy | 95—4.5 X |
| 2,736,770 | 2/1956 | McNaney | 178—15 |
| 2,887,935 | 5/1959 | Scott | 95—4.5 |
| 3,041,930 | 7/1962 | Davidson | 88—24 |

JOHN M. HORAN, *Primary Examiner.*